Dec. 22, 1925.  1,566,488
J. D. LEWIS ET AL
SPEED CONTROL SYSTEM FOR PUSH BUTTON ELECTRIC ELEVATORS
Filed July 31, 1922
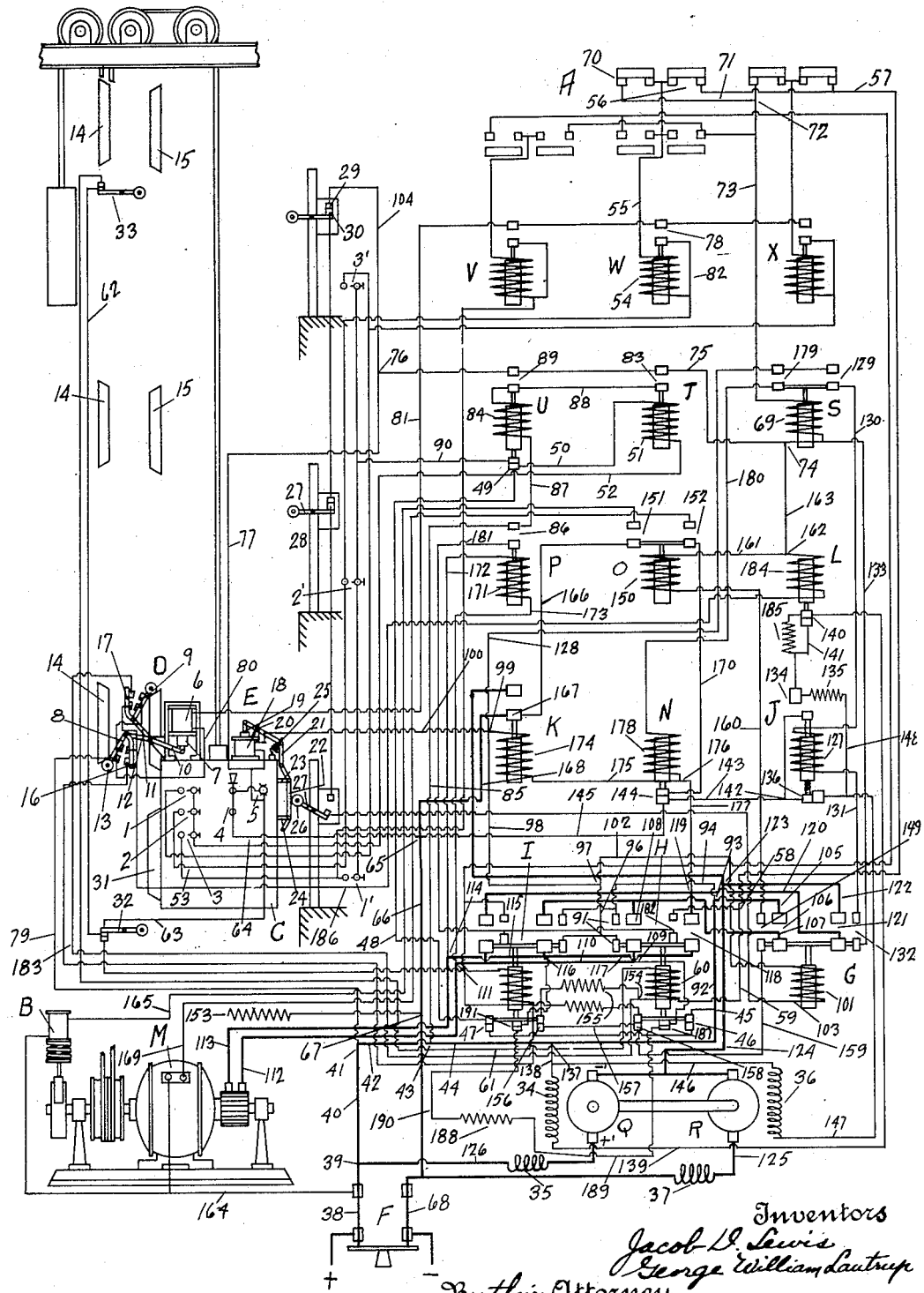
Inventors
Jacob D. Lewis
George William Lautrup
By their Attorney
L. N. Campbell Patented Dec. 22, 1925.

1,566,488

UNITED STATES PATENT OFFICE.

JACOB D. LEWIS AND GEORGE WILLIAM LAUTRUP, OF YONKERS, NEW YORK, ASSIGNORS TO OTIS ELEVATOR COMPANY, OF JERSEY CITY, NEW JERSEY, A CORPORATION OF NEW JERSEY.

SPEED-CONTROL SYSTEM FOR PUSH-BUTTON ELECTRIC ELEVATORS.

Application filed July 31, 1922. Serial No. 578,635.

*To all whom it may concern:*

Be it known that we, JACOB D. LEWIS and GEORGE WILLIAM LAUTRUP, citizens of the United States, residing at Yonkers, in the county of Westchester and State of New York, have invented a new and useful Improvement in Speed-Control Systems for Push-Button Electric Elevators, of which the following is a specification.

Our invention relates to a system of speed control for direct current motors, and shown and described herein as a system of speed control for a motor of the said type used as the hoisting means in an elevator.

In a companion application to this, Serial No. 574,617, filed July 13, 1922, entitled Speed control system for electric elevators, we illustrated and described our invention as applied to a car switch controlled elevator, but which contained some claims readable on a push button controlled elevator as well; the present application illustrates and describes our invention as applied to a push button controlled elevator.

The particular apparatus that we employ for controlling the speed of a direct current motor for use in any art in which such a motor may be used, together of course with other controlling means, if there are any, is a motor generator set that may be called a compensator, as far as its use in this invention is concerned. With the compensator there are two methods of obtaining speed control; first, by maintaining constant speed of the compensator; second, by varying its speed. In either case the speed of the motor to be controlled is governed by means of the fields of the compensator. This specification describes the use of the first form of control as a speed controlling means.

The compensator comprises two motors mechanically connected by shafting with each other. One of them is employed as a generator as a compensatory source of supply for the hoisting motor and is preferably compound wound in order that the voltage supplied by the same to the hoisting motor may stay constant, or nearly so, for different load conditions given to the hoisting motor that it may run at the same speed under the different load conditions, the series field of the generator compensating for the different load conditions as it will as well known.

The motor of the compensator is also shown as compound wound but it is not altogether necessary to use such a motor, as any constant speed motor however wound will do, The armature and series field of each are also electrically connected in series in the same electric circuit with each other across the line supply mains, the generator alone also adapted to be connected in parallel with the hoisting motor. The shunt field of each is connected in a circuit by themselves also across the line supply mains. The compensator is adapted to operate in the following manner to control the speed of the hoisting motor. At that time when the elevator hoisting motor is at rest, the shunt field winding of the motor of the compensator is fully excited while the shunt field winding of the generator of the compensator has little or no excitation, that is to say, a large resistance in the circuit of the field of the generator prevents little or no current to flow in that circuit. The compensator will at the time in question run at a definite speed and the voltage across the generator and motor will be zero and full line voltage respectively. That the voltage across the generator is zero is because its shunt field is not excited, or if so, to no extent, and that at this time in question there is no load on the generator, therefore its series field is not effective. To condition the hoisting motor to be started, it is first necessary to connect it in parallel with the generator of the compensator; secondly, the shunt field of the generator is excited, thereby obtaining a voltage across it and consequently across the armature of the hoisting motor. A definite current will therefore flow in the armature of the hoisting motor, which will accelerate up to a definite speed depending upon the voltage induced. The resistance hereinbefore said to be in the circuit of the shunt field of the generator was taken out of the circuit of that field in order that it might be excited and the resistance transferred into the circuit of the shunt field of the motor of the compensator. The transition of the resistance from one field to the other being accomplished in such a way that the field of the generator, in whose circuit the resistance was first, was excited before it was placed in the circuit of the field of the motor of the compensator. As a consequence, the field of the generator was excited to the amount that the excitation of the field of the motor was decreased. Therefore the E. M. F. generated by the generator combined with the C. E. M. F. of the motor equaled the line voltage so that there was little or no change in speed of the compensator. The voltage generated by the generator may now be the same or less than that of the supply lines. At this time the motor of the compensator is short circuited, leaving the generator now to run free as a motor across the line supply mains, and the hoisting motor to be supplied from the same. The hoisting motor is further accelerated by inserting a resistance in its field which brings the hoisting motor up to its full fast speed. In stopping the hoisting motor, the reverse operation takes place, i. e. the voltage across the motor of the compensator is gradually increased while that of the generator is correspondingly decreased.

That the compensator means of speed control offers advantages over other known methods of control for elevators is obvious from the following: each elevator is self contained; simplicity of control board, as the armature current is not controlled, only small magnets required to handle field current; smoothness of operation; compensator not used when running full speed, being used only in starting, as means to accelerate the speed, and in stopping, as means to decelerate the speed; and a notable reduction of power consumption over other methods of control.

Attention being had to the figure, the description begins by first designating the various parts and thereafter pointing out the system of circuits, showing how they act on the different parts to effect the desired results.

An elevator car C is operatively connected to an electric motor M by means of the usual suspension cables. In the car is a normally closed emergency safety switch 4 and a gate switch 5; the emergency switch for the purpose of enabling the attendant in the car to stop the car at any point in its travel, and the gate switch for the purpose of conditioning the controlling circuits to enable the car to be operated when the car gate is closed. If, when the car is operating, the car gate should be opened, thereby opening the gate switch, the car will be brought to a stop, all of which is old and well known. On the top of the car is a winding 6 of a leveling switch D, the purpose of which is to level the car and stop it at the floor landings. The operation of the switch D is as follows: When the car has reached a position opposite to a predetermined point from the floor landing at which floor it is desired that the car should be stopped, the winding of the switch is caused to be de-energized, thereupon the switch will take a position as shown in the figure by reason of the release of the plunger 7 of the switch, dropping by gravity which motion of dropping is transmitted to the arms 8 and 9 of the switch by the lever 10 secured to the plunger by one of its ends, and the levers 11 and 12 each secured at one of their ends to the other end of the lever 10, and their other ends to the arms 8 and 9 respectively of the switch. Supposing that the car is approaching the first floor landing in a down direction of travel, the roller 13 affixed to the arm 8 will strike a cam 14 at that floor, of which cams there is one for each floor landing, and an opposite cam 15 also for each floor landing. The roller 13 in striking the cam 14 will be cammed inwardly together with the arm 8, to which it is attached. The camming of the roller and its arm inwardly will cause contacts on that arm to engage other contacts on another arm, 16, of the switch which serves to keep closed a circuit to the motor M to continue its operation of lowering the car. The motor continues to lower the car until that time when the roller 13 rolls off the cam 14, which rolling of the roller off of the cam serves to open the engagement of the contacts of the arms 8 and 16 with each other, which results in the motor stopping and likewise the car which is now level with the floor landing. The operation of the switch D is similar when the approach of the car to a floor landing to stop thereat is in an up-direction; arm 9 of the switch at such a time being operated when it engages the cam 15 of the floor desired to be stopped at, and the arm 9 by its contacts engaging other contacts on another arm 17 of the switch. Also upon the top of the car is mounted the winding 18 of a door locking and unlocking device E the winding having a plunger 19 to which is fastened a lever pivoted at 20 near its center, and having its other end connected by a rod 21 to a cam 22, which is movably attached to the car by links, 23 and 24, which are pivoted to the car. A small spring 25 tends to keep the cam in its outward position, such position being normal and is the one shown in the drawing. When the winding 18 becomes energized the plunger 19 will be pulled against the action of the spring, thus lifting the cam 22 through the lever and the rod 21. While the cam is being lifted by the energized winding, the links 23 and 24 will cause the cam to be moved inwardly toward the side of the car. The cam 22 when in its extended position is adapted to strike the roller 26 of a lever 27 of the door lock 28 of which door lock there is one on the door of each floor landing. When the cam, 22, strikes the roller of the door lock of a desired floor landing wished to be stopped at, the door is unlocked and the electrical connections in the lock broken, interrupting the circuit in which the contacts 29 and 30 of the lock are, and in which circuit all the door contacts are connected in series. To one side of the car is affixed a cam 31 and in the path of same are limit switches 32 and 33 at the top and bottom of the hatchway in which the car travels. These limit switches when operated by the cam are for the purpose of stopping the car should it run past the terminal floor landings, due to failure of the normal stopping devices. Push button switches 1, 2 and 3 are for operating the car from within, and push button switches 1', 2' and 3' at the first, second and third floor landings are for operating the car to the respective landing at which each button is. Other parts not mentioned heretofore are as follows: an electromagnet brake B for the motor; a main line knife switch F through which a direct current supply is obtained; an electromagnet potential switch G; electromagnet reversing switches H and I controlling the directions of current flow supplied to the motor M; an electromagnet field switch J for the compensator, the switch comprising two movable contacts and two stationary contacts, one of the movable contacts adapted to engage its corresponding stationary contact before the other movable contact disengages with its corresponding stationary contact. Additional parts are: an electromagnet final accelerating switch K; an additional electromagnet field switch L for the compensator; an electromagnet fast speed switch N; an electromagnet brake and field switch O; an electromagnet holding switch P for the reversing switches; and an electromagnet auxiliary fast speed switch S. An electromagnet non-interference switch T; an electromagnet car holding switch U; electromagnet floor switches V, W and X corresponding to the number of floors; and a floor controller A. The compensator, the particular part of the apparatus of the present system of control comprises generator Q and motor R, mechanically connected with each other and electrically connected in the same electric circuit with each other across the line supply mains, as stated hereinbefore. The windings of the generator Q are shunt field winding 34 and series field winding 35, and the windings of the motor R are shunt field winding 36 and series field winding 37. The direction of rotation of both generator and motor of the compensator is always in one and the same direction.

The parts as shown are in their normal positions with the car at rest. Let it be assumed that a passenger in the car desires to go up to the second floor and that push button 2 is pressed for the desired operation. A circuit is thereby established as follows: from the plus line main, through blade 38 of the knife switch F, junction point 29, by wire 40, junction point 41, by wire 42, junction point 43, by wire 44, junction point 45, through contacts 46 of the reversing switch H, and contacts 47 of the reversing switch I, by wire 48, contacts 49 of the car holding switch U, by wire 50, through winding 51 of the non-interference switch T, by wire 52, through the push button switch 2 in the car, by wire 53, through winding 54 of the floor switch W, by wire 55, through switch 56 of the floor controller A, by wire 57, junction point 58, by wire 59, through winding 60 of the reversing switch H, by wire 61, through the limit switch 33, by wire 62, limit switch 32, by wire 63, through the gate switch 5, and safety switch 4, by wire 64, junction point 65, by wire 66, junction point 67, blade 68 of the knife switch F, to the minus line main. Another circuit was closed to the winding 69 of the auxiliary fast speed switch S as follows: starting from the switch 56 of the floor controller A, through another switch 70 of the floor controller, by wire 71, junction point 72, by wire 73, through the winding 69 of the auxiliary fast speed switch, junction point 74, by wire 75, junction point 76, by wire 77, through the gate switch 5, and safety switch 4, by wire 64, and junction point 65 to the minus line main. The non-interference switch T, floor switch W, up-reversing switch H and the auxiliary fast speed switch S, are now closed as the result of closing circuits to their respective windings. Since the circuits just closed will remain closed ordinarily only as long as the push button switch 2 is held pressed, another circuit has been closed to hold closed the switches initially closed by the push button with the exception of the non-interference switch T. The latter circuit is established through the contacts 78 now closed of the floor switch W. The circuit is as follows: starting from the junction point 41, by wire 79, lowermost contact on the arm 8 of the leveling switch D, by wire 80, through the winding 6 of the leveling switch, by wire 81, through the contacts 78 now closed of the floor switch W, by wire 82, through the winding 54 of the switch to the minus line main as before traced. The leveling switch was operated by the circuit last traced and pulls its plunger 4 up within itself which movement is carried to the arms 8 and 9 of the switch which are caused to be positioned vertically so that when the car starts they and the rollers on them are clear of the cams, 14 and 15. The non-interference switch T by its contacts 83 closed a circuit to the winding 84 of the car holding switch U as follows: starting from the junction point 43, by wire 85, contact 86, of the holding switch P, by wire 87, through the winding 84 of the car holding switch, by wire 88, through the contacts 83 of the non-interference switch, by wire 75, junction point 76, to the minus line main by way of the gate switch 5 and safety switch 4. The car holding switch remains closed by a self holding circuit through its contacts 89 closing and by its contacts 49 together with the contacts 46 now open on the reversing switch H, open-circuits the supply wire 90 to the hall push button switches and so prevents operation of the car by the hall button switches until after the car is stopped, the car gate opened, and again closed. Having operated the reversing switch H, it closes by its contacts 91 a circuit to the winding 18 of the door locking and unlocking device E for that switch to operate. The circuit is as follows: as the plus line feed follows by wires 40, 42 and 44, to the junction point 45, the circuit from there is by wire 92, junction point 93, by wire 94, through contacts 91 of the reversing switch, by wire 96, junction point 97, by wire 98, junction point 99, by wire 100, through the winding 18 of the leveling switch, to the minus line main by way of the gate switch 5 and safety switch 4. The device E will operate its cam 22 as related, the contacts 29 and 30 of the door lock 28 at the first floor landing closing if the door is closed. The closing of the contacts 29 and 30 establishes a circuit to the winding 101 of the potential switch for that switch to close. The circuit is as follows: starting from the junction point 97, by wire 102, through the winding 101 of the switch, by wire 103, through the contacts 29 and 30 now closed of the door lock at the first floor and through the contacts of the door locks of the other floors, by wire 104, junction point 76, to the minus line main by way of the gate and safety switches.

With the reversing switch H closed and having just closed the potential switch G the circuit to the motor M is closed. The circuit to the motor is as follows: from the plus line main, by wires 40, 42, 44 and 92, junction point 93, by wire 105, through contacts 106 now closed of the potential switch, by wire 107, through contacts 108 of the reversing switch H, junction point 109, by wire 110, junction point 111, by wire 112, through the armature of the motor, by wire 113, junction point 114, by wire 115, junction point 116, by wire 117, through contacts 118 of the reversing switch H, junction point 119, by wire 120, through contacts 121 now closed of the potential switch, by wire 122, junction point 123, by wire 124, through the armature of the motor R of the motor generator set, and by wire 125 to the minus line main. The motor M along with being connected with the line supply mains, is also connected in parallel with the generator Q of the motor generator set. The circuit including the motor M and generator Q is as follows: from the plus side of the generator, by wire 126, by wires 40, 42, 44 and 92, through the contacts 106 of the potential switch and contacts 108 of the reversing switch, through the armature of the motor M, back through the contacts 118 of the reversing switch and contacts 121 of the potential switch to the minus side of the generator Q. Immediately after the potential switch closes a circuit is established to the winding 127 of the field switch J as follows: starting from the contacts 91 of the reversing switch as the plus feed follows up to the contacts, by wire 96, junction point 97, by wire 98, junction point 99, by wire 128, through contacts 129 now closed, of the auxiliary fast speed switch S, by wire 130, through the winding 127 of the field switch J, by wire 131, through contacts 132 now closed of the potential switch, by wire 133, junction point 74, by wire 75, junction point 76 to the minus line main by way of the car gate switch 5 and the safety switch 4. The field switch J operates by the closing of the circuit just traced, and closes its top contacts and opens its bottom contacts, closing its top contacts first before its bottom contacts are opened, as related hereinbefore. The closing of the top contacts 134 cuts out of circuit of the field 34 of the generator Q a resistance 135, that hereinbefore was said to be in the circuit to the field, connecting the field now across the line supply mains. The opening of the bottom contacts 136 of the switch places the resistance 135 in the circuit to the shunt field 36 of the motor R, the top contacts of the switch closing first before the transition takes place. As a consequence, the field 34 of the generator Q has been excited to the amount that the excitation of the field 36 of the motor R has been decreased. The circuit for the field 34 of the generator Q may be traced at the time in question, that is with the resistance 135 now out of its circuit as follows: starting from the junction point 137 on the line 44, as the plus line feed follows up to this point, by wire 138, through the field 34 of the generator, by wire 139, through contact 140 of the field switch L, by wire 141, through contacts 134 now closed of the field switch J, junction point 142, by wire 143, contact 144 of the fast speed switch N, by wire 145, and junction point 65, to the minus line main. The circuit for the field 36, of the motor R at the time in question is traced as follows: that is with the resistance 135 now in the circuit to the field; starting from junction point 137 as before, by wire 138, by wire 146, through the field 36, by wires 147 and 148, through the resistance 135, through the contacts 134 of the field switch, to the line minus main as traced before. The generator Q is now operating as a generator and since its field was excited to the amount that the field of motor R was decreased, the E. M. F. generated by the generator Q combined with the C. E. M. F. of motor R will equal the line voltage so that there was little or not change in speed in the compensator. Since it is the hoisting motor M that is to be controlled and operated to hoist the car, the voltage generated by the generator Q is supplied to it at this instant for starting. The hoisting motor is connected in parallel with the generator in order that it may be operated by the same. This connection has already been made since it was told hereinbefore that the reversing switch H and the potential switch G were operated. The brake B was also released upon the closing of those two switches, the brake being released in the following manner. The closing of the potential switch G by its contacts 149 closed a circuit to the winding 150 of the brake and field switch O, for it to operate which by its set of contacts 151 closes the circuit to release the brake and by its other set of contacts 152 closes a circuit paralleling a resistance 153 in circuit with the field of the hoisting motor M that that motor in starting may start on a strong field. The circuit including the winding of the brake and field switch O is as follows: starting from the switch 56 of the floor controller as the plus feed follows up to it, by wire 57, junction point 58, by wire 59, junction point 154, through a resistance 155, through contacts 156 of the down-reversing switch I, by wire 157, contact 158 of the reversing switch H, by wire 159, through the contacts 149, now closed, of the potential switch G, by wire 160, through the winding 150 of the brake and field switch O, by wire 161, junction point 162, by wires 163 and 75, junction point 76, to the minus line main. The circuit to the brake B is as follows: starting from the plus line main, blade 38 of the knife switch F, by wire 164, through the winding of the brake, by wire 165, through contacts 151, now closed, of the brake and field switch O, by wire 166, contact 167 of the final accelerating switch, by wire 168, and junction point 65, to the minus main. The circuit including the field of the hoisting motor M is as follows: from the plus line main, blade 38 of the knife switch F, by wire 164, through the field of the motor, by wire 169, through the contacts 152 now closed of the brake and field switch O, by wire 170, through contacts 144 of the fast speed switch N, by wire 145, junction point 65, to the minus line main. The hoisting motor M is now operating at a speed proportional to the voltage being supplied to it. The winding 171 of the holding switch P has been energized for it to close the contacts of its switch by the C. E. M. F. of the hoisting motor, the switch being adapted to operate at a small value of the C. E. M. F. of the hoisting motor. There is no significance to the switch operating at this time other than it has closed its contacts. The circuit for its winding 171 is as follows: the circuit is started from the junction point 114 as the feed from one side of the hoisting motor follows up to this point, by wire 172, through the winding 171 of the switch, by wire 173, and junction point 111, to the other side of the hoisting motor. The final accelerating switch K is also operated to close its contacts 167 by the winding 174 of the switch when a predetermined value of C. E. M. F. of the hoisting motor is obtained, and which value has now been obtained. The circuit including the winding 174 may be traced out as follows: from the plus' side of the generator to the junction point 99, by way of wires 40, 42, 44 and 92 and contacts 91 of the reversing switch H, through the winding 174, by wire 175, junction point 176, by wire 177, junction point 119, by wire 120, through the contacts 121 of the potential switch, by wire 122, junction point 123, and wire 124, to the minus' side of the generator. The switch K when operated short circuits the motor R of the motor-generator set, leaving the generator Q to run free as a motor across the supply mains. As the hoisting motor M has accelerated up to a speed proportional to the voltage supplied by the generator, the voltage being the same as the supply mains, or nearly so, the generator is no longer used as a supply source. At this time the winding 178 of the fast speed switch N is energized, the winding being energized by the C. E. M. F. of the motor M. The switch in closing short circuits the resistance 153 in circuit with the field of the motor M, the motor as a result accelerating up to its full fast speed. The circuit for operating the winding 178 of the switch N is as follows: starting from the junction point 97, as the feed follows as was traced for operating the winding 174 of the switch K up to this point, by wire 98, junction point 99, by wire 128, through contacts 179 of the auxiliary fast speed switch S, by wire 180, through the winding 178 of the fast speed switch N, junction point 176, by wire 177, junction point 119, by wire 120, through the contacts 121 of the potential switch, by wire 122, junction point 123, and wire 124, to the minus ' side of the generator. The fast speed switch N therefore operates as a result of the circuit established, just traced, and opens its contacts 144 which places the resistance 153, that was before paralled by the closing of the contacts 152 of the brake and field switch O, in circuit with the field of the hoisting motor which allows the speed of the motor to increase.

The hoisting motor is now operating at its full fast speed and hoisting the car in the up-direction.

It will be assumed that a position opposite a predetermined point from the second floor at which floor it was said hereinbefore that the car is to be stopped, has been reached. With the car now at the point in question, the switch 70 of the floor controller A is adapted to be opened, the opening of the switch serving to deenergize the winding 69 of the auxiliary fast speed switch S. The switch S, by its contacts 129, opens the circuit to the winding 178 of the switch N, and that switch by its contacts 144 closes, placing a short circuit around the resistance 153 in circuit with the field of the motor M. The motor M now having full field strength the speed of the same is reduced. The slowing down of the motor M effects the deenergizing of the winding 174 of the switch K, that switch by its contacts 167 removing the short circuit around the motor R, and the return of the generator Q as a source of supply to the motor M. Simultaneously with the opening of the switch N, the switch J is opened, and opened by the other contacts 129 of the switch S opening the circuit to the winding 127. The switch J removes the resistance 135 from the circuit of the field of the motor R and replaces it in the circuit of the generator Q. The transition of the resistance at this time allows the voltage of motor R to increase while that of generator Q is correspondingly decreased, also the voltage across the hoisting motor M connected in parallel with it. The speed of the hoisting motor has therefore been greatly reduced. It will be assumed that a position opposite another predetermined point from the second floor has now been reached by the car, that the switch 56 of the floor controller A opens, which deenergizes the winding 6 of the leveling switch D which switch is now in position to be operated by the cam 14 or 15 when it strikes them. Until the leveling switch runs into the leveling cams by the coasting of the car, the reversing switch is held closed by a circuit through the contacts 86 of the holding switch P, which switch was hereinbefore described as operated by the C. E. M. F. of the hoisting motor and by a small value of the same. The circuit for holding the reversing switch closed at this time is as follows: starting from the junction point 48 on lines 42—44, by wire 85, through the contacts 86 of the holding switch P, by wire 181, contacts 182 of the reversing switch H, junction point 58, by wire 59, through the winding 60 of the reversing switch H, by wire 61, through the limit switch 33, by wire 62, limit switch 32, by wire 63, through the gate switch 5 and safety switch 4 to the minus main. Upon the car running into the leveling zone the circuit held closed just traced for maintaining the reversing switch operated is picked up so to speak by the leveling switch D, the roller on the arm 9, of the switch, engaging with the leveling cam 15 at the second floor landing, which engagement serves to move the arm inwardly, the contacts on the same engaging corresponding contacts on the arm 17 of the switch. The circuit for holding the reversing switch closed at this time is by means of the upper contacts on the arm 9 now engaged with the corresponding upper contact on the arm 17. The circuit is as follows: starting from the junction point 41, by wire 79, through the contacts designated of the switch D, by wire 183, and junction point 154 to and through the winding 60 of the reversing switch H, to the minus line main, as traced before. Since the reversing switch is held closed so also is the door locking and unlocking device E held operated. The potential switch is also held closed by the reversing switch, the potential switch by its contacts 149 holds close a circuit for holding off the brake B of the motor. The circuit to the brake B was hereinbefore told as made by the closing of the contacts 151 of the brake and field switch O, and that that switch was made to operate by the closing of the contacts 149 of the potential switch. The circuit to the winding 150 of the switch O at this time is as follows: starting from the junction point 41, by wire 79, through the upper contacts of both the arms 9 and 17 of the leveling switch, by wire 183, junction point 154, resistance 155, contacts 156, by wire 157, contact 158, by wire 159, contacts 149, to and through the winding 150, to the minus line main, as before traced. The engagement with each other of the lower contacts on the arms 9 and 17 of the leveling switch D serves to establish a circuit to the winding 184 of the field switch L, which when operated opens its contacts 140, thereby inserting a resistance 185, in the circuit of the field 34 of the generator of the compensator which reduces the strength of its field, consequently the voltage of the generator is reduced and also that across the hoisting motor which is further reduced in speed. The circuit to the winding 184 of the field switch L is as follows: starting from the junction point 41, by wire 79, through the lower contacts on the arms 9 and 17, by wire 186, through the winding 184 of the switch L, junction point 162, by wire 163, junction point 74, by wire 75, and junction point 76, to the minus line main. At the time the roller on the arm 9 of the switch D rolls off of the cam 15, which rolling off the cam serves to move the arm 8 on which it is fastened away from the arm 17, the contacts of both arms are disengaged from each other, the disengagement of which serves to open the circuits to the winding of the remaining switches operated, namely the reversing switch H, door locking and unlocking device E, the potential switch G, brake and field switch O, and the field switch L. The switches opening the circuits they hold closed. The reversing switch in opening opens the circuit to the hoisting motor M, and places by its contacts 187, which close when the switch opens, a resistance 188 across the hoisting motor for it to come to rest dynamically. The dynamic brake circuit is as follows: starting from the junction point 109, through the contacts 187 now closed of the reversing switch H, by wire 189, through the resistance 188, by wire 190, through contacts 191 of the reversing switch I, to juncture point 116. The brake B serves to hold the motor at rest after it has stopped. The car is now stopped level with the second floor landing and the door at the landing has been unlocked by the cam of the device E, which was caused to assume its normal position by the opening of the reversing switch H. A passenger in the car desiring to get out at the second floor can now do so, if or when the car gate has been opened.

Having thus described our invention, and with an automatic push button controlled elevator, what we claim as new and desire to secure by Letters Patent of the United States is:

1. In an automatic push button elevator, the hoisting motor, a source of current therefor, a reversing switch, a car leveling switch, and devices which it is adapted to strike and thereupon be closed thereby, and having a winding, adapted to hold said leveling switch out of contact with said devices, a floor switch having a winding, said floor switch adapted upon closing to establish a circuit to the windings of said leveling and reversing switches, a floor controller, adapted to open the circuit to the windings of said leveling and reversing switches, and a holding switch adapted to hold the reversing switch closed regardless of the opening of said circuit while the hoisting motor is above a predetermined speed, said leveling switch being operative to control the reversing switch to bring the elevator car to a stop level with a desired landing.

2. In an automatic push button elevator, the hoisting motor, a source of current therefor, a reversing switch, a car leveling switch, and devices which it is adapted to strike and thereupon be closed thereby, and having a winding, adapted to hold said leveling switch out of contact with said devices, a floor switch having a winding, said floor switch adapted upon closing to establish a circuit to the windings of said leveling and reversing switches, a floor controller, adapted to open the circuit to the windings of said leveling and reversing switches, and a holding switch adapted to hold the reversing switch closed regardless of the opening of said circuit and having its coil dependent for current upon the hoisting motor, said leveling switch being operative to control the reversing switch to bring the elevator car to a stop level with a desired landing.

In testimony whereof, we have signed our names to this specification.

JACOB D. LEWIS.
GEORGE WILLIAM LAUTRUP.